(12) United States Patent
Hickman et al.

(10) Patent No.: US 8,817,021 B1
(45) Date of Patent: Aug. 26, 2014

(54) SYSTEM FOR WRITING, INTERPRETING, AND TRANSLATING THREE-DIMENSIONAL (3D) SCENES

(71) Applicant: Google Inc., Mountain View, CA (US)

(72) Inventors: Ryan Hickman, Mountain View, CA (US); James J. Kuffner, Jr., Mountain View, CA (US); Anthony Gerald Francis, Jr., San Jose, CA (US); Arshan Poursohi, Berkeley, CA (US); James R. Bruce, Sunnyvale, CA (US); Thor Lewis, San Francisco, CA (US); Chaitanya Gharpure, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/644,680

(22) Filed: Oct. 4, 2012

Related U.S. Application Data

(60) Provisional application No. 61/558,911, filed on Nov. 11, 2011.

(51) Int. Cl.
*G06T 17/00* (2006.01)
(52) U.S. Cl.
USPC ............................ 345/420; 345/426; 345/619
(58) Field of Classification Search
USPC .................................................. 715/757, 772
See application file for complete search history.

(56) References Cited

U.S. PATENT DOCUMENTS

| | | | |
|---|---|---|---|
| 6,437,784 B1 * | 8/2002 | Bentley et al. | 345/473 |
| 2007/0040819 A1 * | 2/2007 | Inazumi | 345/204 |
| 2010/0011312 A1 * | 1/2010 | Banerjee et al. | 715/772 |
| 2010/0229108 A1 * | 9/2010 | Gerson et al. | 715/757 |
| 2010/0289804 A1 * | 11/2010 | Jackman et al. | 345/520 |
| 2011/0099608 A1 * | 4/2011 | Queck et al. | 726/4 |
| 2011/0149266 A1 * | 6/2011 | Motzer et al. | 356/4.01 |
| 2013/0127858 A1 * | 5/2013 | Leroy et al. | 345/426 |

OTHER PUBLICATIONS

Emmerik, Maarten J. G. M. "Interactive Design of 3D Models with Geometric Constraints." The Visual Computer, 7.5-6 (1991): 309-325.*
Autodesk 123D Catch, Catch and carry, Turn ordinary photos into extraordinary 3D models, www.123dapp.com/catch, 2013.

* cited by examiner

*Primary Examiner* — Phi Hoang
(74) *Attorney, Agent, or Firm* — McDonnell Boehnen Hulbert & Berghoff LLP

(57) ABSTRACT

Methods and systems for writing, interpreting, and translating three-dimensional (3D) scenes are provided. An example method may involve accessing data associated with a three-dimensional (3D) scene that includes one or more objects of the 3D scene and one or more rendering effects for the one or more objects. Requests for assets and instructions associated with rendering the one or more objects based on the data associated with the 3D scene may be determined and sent to a server. Additionally, the method may include receiving from the server assets and instructions that facilitate rendering the one or more objects based on the one or more rendering effects. According to the method, the one or more objects of the 3D scene may be rendered based on the received instructions and the received assets.

19 Claims, 7 Drawing Sheets

```
{
    // List of objects in the scene.
    "objects": {

"phone_glass": {
            "geometry": "phone_glass.xml", "version": 2.0,
"material": "phone_glass", "utf8_params": {params},
"transform": {scale}, "rotation": {angle, axis},
"translation": {x, y, z}
        }, "battery_cover": {...},
        "camera_bezel": {...},
        "camera_flash": {...},
        "camera_lens": {...},
        "charging_pins": {...},
        "chrome": {...},
        "plastic": {...},
            .
            .
            .

// Shared material library.
    "materials": {
        "phone_glass":   {"shader_name":   "phone_glass",
"diffuse_map": ["front_glass-rgb.jpg"], "diffuse_color":
[r, g, b], "environment_map": "environment_map-
rgb.jpg"},
        "battery_cover": {...},
        "camera_bezel": {...},
            .
            .
            .
    }, // Default global lighting in the scene.
    "lights": { }
}
```

Labels: 300, 302, 304, 306, 308

FIGURE 3

SYSTEM FOR WRITING, INTERPRETING, AND TRANSLATING THREE-DIMENSIONAL (3D) SCENES

CROSS-REFERENCE TO RELATED APPLICATIONS

This application claims the benefit of U.S. Provisional Application No. 61/558,911 filed on Nov. 11, 2011, the entirety of which is herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one example aspect, a method is provided that involves accessing data associated with a three-dimensional (3D) scene, wherein the data associated with the 3D scene comprises one or more objects of the 3D scene and one or more rendering effects for the one or more objects. The method may also include determining one or more requests for assets and instructions associated with rendering the one or more objects based on the data associated with the 3D scene, and sending the one or more determined requests for assets and instructions to a server. Additionally, the method may include receiving from the server assets and instructions that facilitate rendering the one or more objects based on the one or more rendering effects. The assets may include one or more shaders for rendering the one or more objects based on the one or more rendering effects. According to the method, the one or more objects of the 3D scene may be rendered based on the received instructions and the received assets.

In another example aspect, a computer-readable medium having stored therein instructions, that when executed by a computing device, cause the computing device to perform functions is provided. The functions may involve accessing data associated with a three-dimensional (3D) scene, wherein the data associated with the 3D scene comprises one or more objects of the 3D scene and one or more rendering effects for the one or more objects. The functions may also include determining one or more requests for assets and instructions associated with rendering the one or more objects based on the data associated with the 3D scene, and sending the one or more determined requests for assets and instructions to a server. Additionally, the functions may include receiving from the server assets and instructions that facilitate rendering the one or more objects based on the one or more rendering effects. The assets may include one or more shaders for rendering the one or more objects based on the one or more rendering effects. According to the functions, the one or more objects of the 3D scene may be rendered based on the received instructions and the received assets.

In still another example aspect, a system is provided that involves an input component, a translation component, and a rendering component. The input component may be configured to access a three-dimensional (3D) scene document to determine information associated with one or more objects of a 3D scene and one or more rendering effects for the one or more objects based on data within the 3D scene document. The translation component may be configured to determine one or more requests for assets and instructions associated with rendering the one or more objects based on the data within the 3D scene document and may be configured to send the one or more requests for assets and instructions to a server. The rendering component may be configured to render the 3D scene having the one or more objects based on assets and instructions received from the server. The assets may include one or more shaders for rendering the one or more objects based on the one or more rendering effects.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3 illustrates an example format and structure of a three-dimensional (3D) scene document.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for writing, interpreting, and translating three-dimensional (3D) scenes. An example system may include components for interpreting data associated with a 3D scene and converting the data into instructions for rendering a 3D scene. In some examples, a structure of a 3D scene document may define how to render a scene by defining, at a high level, objects within the scene and rendering effects associated with the objects. The 3D scene document may be used as a standard way to describe materials of objects in a 3D scene and enable automatic retrieval of assets to use for consistently rendering the materials across multiple 3D scenes. For example, a 3D scene document may be translated into requests for assets and instructions that when combined, may be executed to create 3D graphics in a web browser. In one instance, the received instructions may be provided to an application programming interface (such as WebGL or OpenGL ES) to facilitate rendering a 3D scene.

Figure 1:
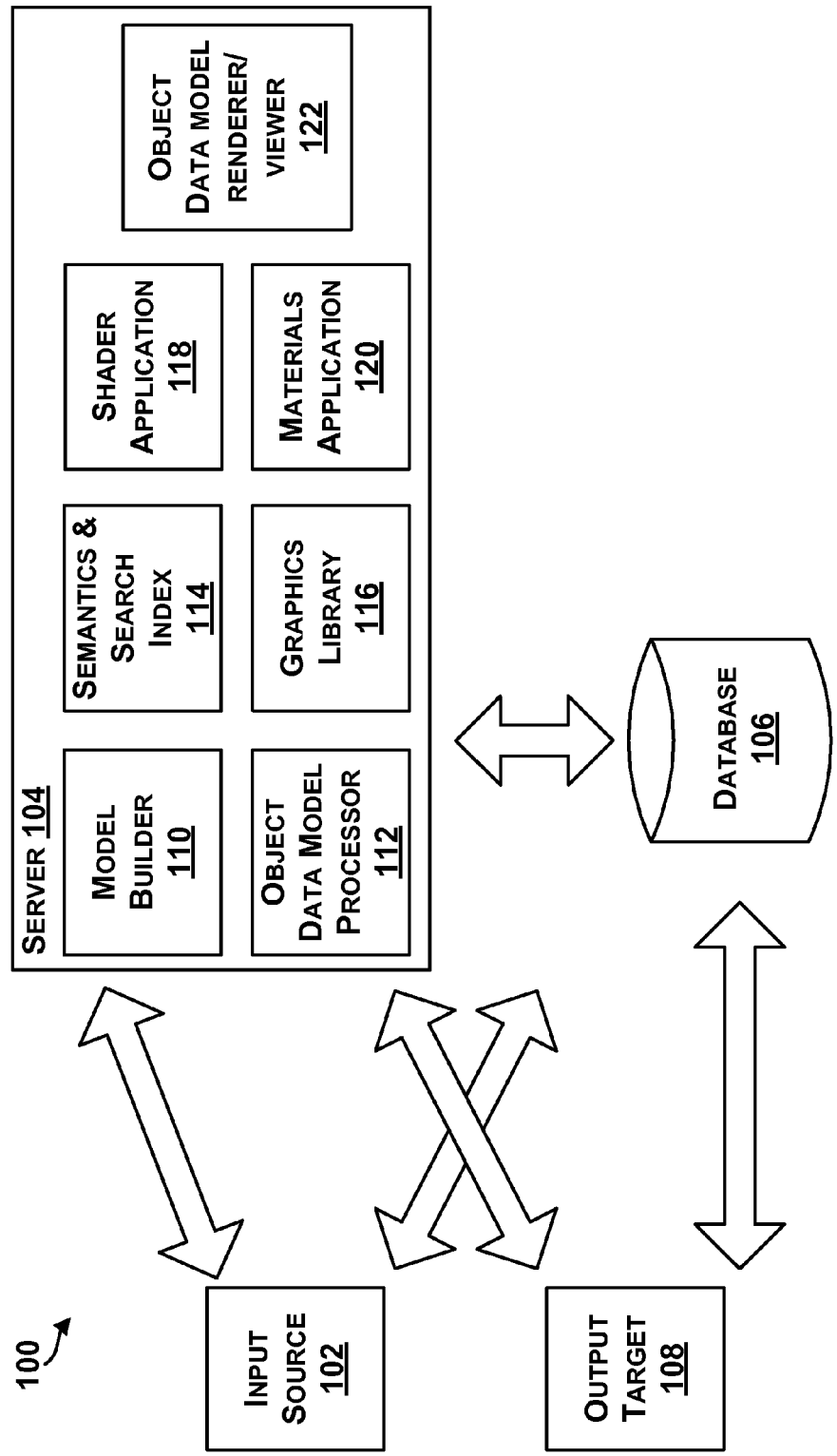
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with vendors or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
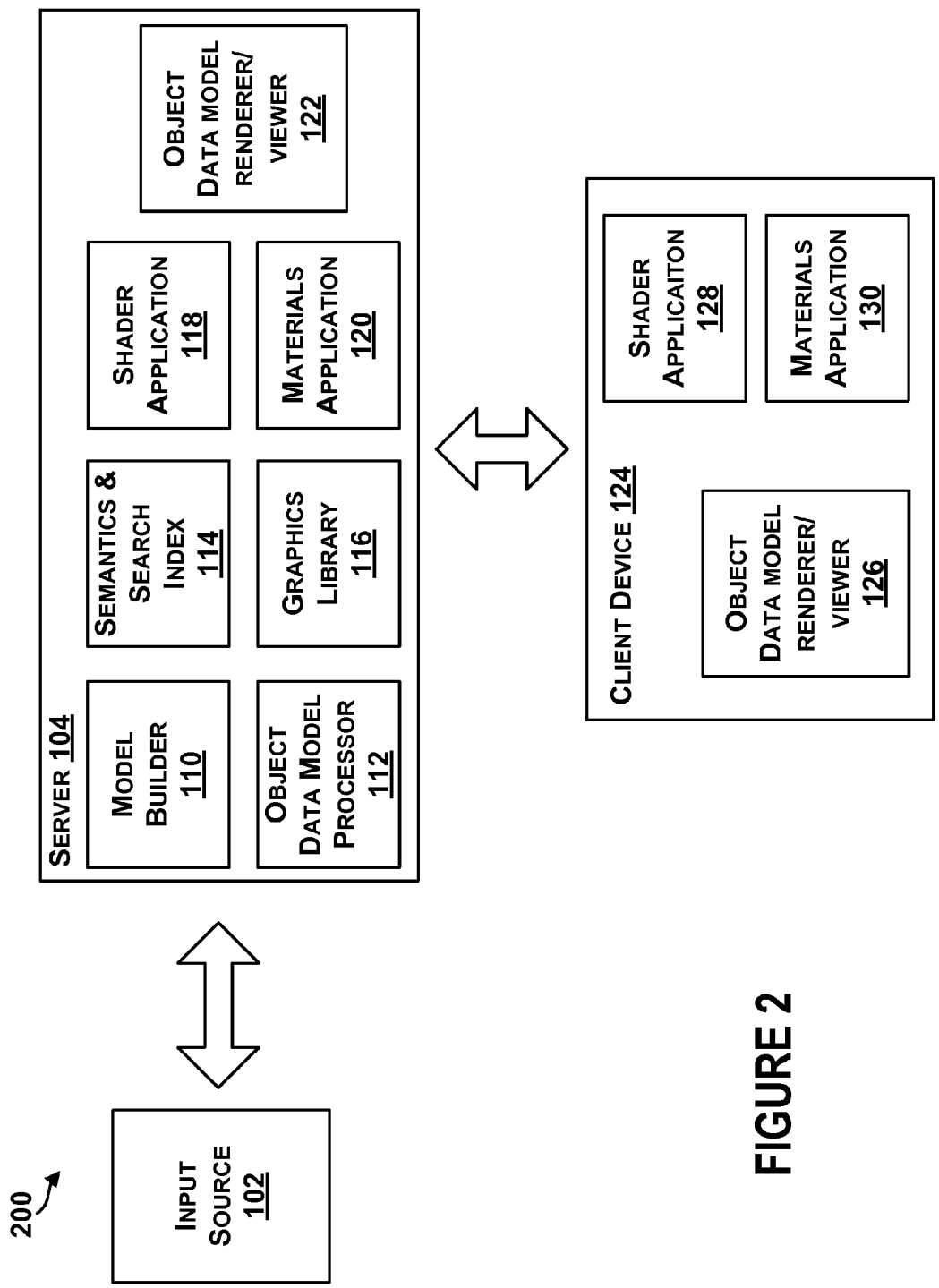
FIG. 2 illustrates another example system for object data modeling.

FIG. 2 illustrates another example system 200 for object data modeling. The system 200 includes the input source 102 coupled to the server 104, which is coupled to a client device 124. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 of FIG. 1.

In some examples, the client device 124 may receive the 3D object data model file or files from the server 104, and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and materials information to apply. In other examples, the server 104 may render a 3D image of the object and stream the 3D image to the client device 124 for display.

As described, in some examples, the 3D object data model may include various forms of data, such as raw captured image data, mesh data, processed data, etc. Data of the 3D object data model may be encoded and compressed so as to store information related to 3D geometry of an object associated with information related to appearance of the object for transmission and display within a web browser or application on a device. In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or an application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): (x<<1)^ (x>>15) with a corresponding decoding (during decompression) to follow the format UnZigZag(x): (x>>1)^ (−(x & 1)). ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in a local memory of the client device 124. The client device 124 may display exemplary screenshots of an initial default view of a 3D object, based on the searchable data of the 3D object data model file loaded in the web browser.

In some examples, the 3D object data file includes information as to geometry of an object stored by material and divided into portions to be loaded as fragments and reassembled in portions by the client device. As one example, for a mobile phone comprising multiple parts, each part may be rendered using a separate or distinct shader for each material. Thus, the 3D object data model file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

FIG. 3 illustrates an example format and structure 300 of a three-dimensional (3D) scene document. The structure 300 includes a list 302 of object portions in a scene constituting one or more objects, a list 304 of libraries, and other attributes 306 of the scene. For instance, the list 302 may include objects that are components of one or more 3D object data models. The list 302 references geometry of the 3D scene and divides the geometry into specific portions that are identified as objects or components of one or more objects. For example, the structure 300 may describe a mobile phone, and the list 302 may divide the geometry of the mobile phone into portions of the mobile phone, such as a phone glass, battery cover, camera bezel, camera flash, camera lens, charging pins, chrome, plastic, etc.

Each given object or portion may include additional information specifying details of the object or portion. For example, object 308 directed to the phone glass also includes information as to geometry information for the phone glass, parameters or attributes of the phone glass, and transforms to apply to position the phone glass in the 3D scene. In one example, geometry information, such as a 3D mesh data file or vertex positions may be stored within an xml file. The parameters or attributes of the phone glass may describe a material for the phone glass. The transform may include a scale (e.g., one or more values in x, y, and/or z directions), rotation (e.g., an amount of rotation with respect to an axis of the 3D scene), and a translation (e.g., amounts of movement in x, y, and/or z, directions with respect to a position of the 3D scene). In some examples, decoding parameters for each attribute of the phone glass are also included for the object 308.

The list 304 of libraries may be pointers to specific shaders, diffusion maps, or environment maps per object in the list 302 of objects. For example, the phone glass object 302 may be associated with a specific shader while the battery cover may be associated with a separate shader. In one example, the diffuse map may be specified as a bitmap image that may be wrapped onto the surface geometry of the object to add color to the object. Optionally, an environment map may be specified as a reflection image that is projected onto the surface geometry of the object to add a specular effect to the object. Other types of maps may also be described within the material library such as bump maps, opacity maps, glow maps, or specular maps. The other attributes 306 include information associated with other aspects of rendering a scene of the objects, such as lighting, background images, camera position, animation, etc.

Table 1 below illustrates another example 3D scene document of a similar structure as the structure 300 with further details and examples.

TABLE 1

```
{
  "version": 1.0,
  // UTF8 decoding scene-wide parameters.
  "decode_params": {"decodeOffsets": [−4108, −2985, −738, 0, 0, −511, −511, −511],
  "decodeScales": [0.000026, 0.000026, 0.000026, 0.000978, 0.000978, 0.001957, 0.001957,
0.001957]},
  // List of objects in the scene.
  "objects": {
    // All "Phone" Object model parts grouped by material and chunked by maximum vertex
    // array index of roughly 63000. Decoding parameters for each attribute of each part is
    // stored along with the part itself.
    "phone_glass": {
      "geometry": "phone_glass.xml", "version": 2.0, "material": "phone_glass", "utf8_params":
{"attribRange": [0, 42000], "indexRange": [336000, 14000], "bboxes": 378000, "names":
["phone_glass"], "lengths": [42000]},
      "transform":{"scale": [5.0, 5.0, 5.0 ], "rotation": {"angle": 180, "axis": [ 0.0, 1.0, 0.0 ]},
"translation": [ 0.0, −0.13, 0.0 ]}
    },
    "battery_cover": {
      "geometry": "battery_cover.xml", "version": 2.0, "material": "battery_cover",
"utf8_params": {"attribRange": [0, 30080], "indexRange": [240640, 15040], "bboxes": 285760,
"names": [prime_reduced_battery_cover_battery_cover1"], "lengths": [45120]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "camera_bezel": {
      "geometry":   "camera_bezel.xml", "version": 2.0, "material": "camera_bezel",
"utf8_params": {"attribRange": [0, 33800], "indexRange": [270400, 11268], "bboxes": 304204,
"names": ["camera_bevel"], "lengths": [33804]},
      "transform": {"scale": [ 5.0, 5.0, 5.0 ],"rotation": {"angle": 180, "axis": [ 0.0, 1.0, 0.0 ]},
"translation": [ 0.0, −0.13, 0.0 ]}
    },
    "camera_flash": {
      "geometry": "camera_flash.xml", "version": 2.0," material": "camera_flash",
      "utf8_params":
{"attribRange": [0, 1937], "indexRange": [15496, 3264], "bboxes": 25288, "names":
["prime_cad _2_poly1:flash1"] "lengths": [9792]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
```

TABLE 1-continued

```
    },
    "camera_lens": {
        "geometry": "camera_lens.xml", "version": 2.0,"material": "camera_lens",
"utf8_params": {"attribRange": [0, 1344], "indexRange": " bboxes": 12768,
"names": ["prime_cad_2_poly1:primecamera"]," lengths": [2016]},
        "transform": {"scale": [ 5.0, 5.0, 5.0 ],"rotation": "{angle": 180, "axis": [ 0.0, 1.0, 0.0 ] },
"translation": [ 0.0, −0.13, 0.0 ]}
    },
    "charging_pins": {
        "geometry":"charging_pins.xml", "version": 2.0," material": "charging_pins",
"utf8_params": {"attribRange": [0, 243], "indexRange": [1944, 336], "bboxes": 2952, names":
["charging contact"s], "lengths": [1008]},
        "transform": {"scale": [ 5.0, 5.0, 5.0 ], "rotation": {"angle": 180, "axis": [ 0.0, 1.0, 0.0 ]
"translation": [ 0.0, −0.13, 0.0 ]}
    },
    "chrome": {
        "geometry": "chrome.xml", "version": 2.0, "material": "chrome", "utf8_params":
{"attribRange": [0, 7469], "indexRange": [59752, 9147], "bboxes": 87193, "names":
["usb_prong",                                    "prime_cad_2_poly1:camera_ring2",
"prime_cad_2_poly1:camera_inner_ring1"],"lengths": [9969, 12096, 5376]},
        "transform": {"scale": [ 5.0, 5.0, 5.0 ],"rotation": {"angle": 180,"axis": [ 0.0, 1.0, 0.0 ]},
"translation": [ 0.0, −0.13, 0.0 ]}
    },
    "plastic": {
        "geometry": "plastic.xml","version": 2.0, "material": "plastic", "utf8_params":
{"attribRange": [0, 55294], "indexRange": [442352, 497779], "bboxes": 787834, "names":
["front_trim",     "audio_jack",    "power_button",    "volume_controls",    " usb_jack",
"prime_reduced_rear_trim_prime"]," lengths": [86784, 2880, 696, 828, 1446, 56703]},
        "transform": {"scale": [ 5.0, 5.0, 5.0 ], "rotation": {"angle": 180,"axis": [ 0.0, 1.0, 0.0 ]},
"translation": [ 0.0, −0.13, 0.0 ]}
    },
    "plastic2": {
        "geometry": "plastic.xml", "version": 2.0,"material": "plastic","utf8_params":
{"attribRange": [591689, 20647], "indexRange": [756865, 10323], "bboxes": 787870,
"names": ["prime_ reduced_rear_trim_prime"], "lengths": [30969]},
        "transform": {"scale": [ 5.0, 5.0, 5.0 ],"rotation": {"angle": 180,"axis": [ 0.0, 1.0, 0.0 ]},
"translation": [ 0.0, −0.13, 0.0 ]}
    },
    "speaker": {
        "geometry": "speaker.xml", "version": 2.0, "material": "speaker", "utf8_params":
{"attribRange": [0, 4124], "indexRange": [32992, 6506], "bboxes": 52510, "names":
["prime_ reduced_front_speaker_prime", "rear speaker"],"lengths": [5292, 14226]},
        "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "screen": {
        "geometry": "screen.xml", "version": 2.0, "material": "screen", "utf8_params":
{"attribRange": [0, 247], "indexRange": [1976, 446], "bboxes": 3314, "names":
["prime_reduced_phone_screen_lcd_d_phone_screen_lcd_polysurface1"], "lengths": [1338]},
        "transform": {"scale": [ 5.0, 5.0, 5.0 ], "rotation": {"angle": 180,"axis" : [ 0.0, 1.0, 0.0 ]},
"translation": [ 0.0, −0.13, 0.0 }
    }
  },
  // Shared material library.
  "materials":    {"battery_cover":   {"shader_name":   "battery_cover",   "diffuse_map":
["battery_cover-rgb.jpg"]},
    "camera_flash": {"shader_name": "camera_flash", "diffuse_map": ["camera_flash-rgb.jpg"],
"environment_map":"environment-rgb.jpg"},
    "camera_lens": {"shader_name": "camera_lens","diffuse_map": ["camera_ lens-rgb.jpg"],
"environment_map": "environment-light.png"},
    "camera_bezel": {"shader_name": "camera_bezel", "diffuse_map": ["camera_bezel-
rgb.jpg"]},
    "charging_pins": {"shader_name": "charging_pins","diffuse_map" : ["charging_pins-
gb.jpg"], "diffuse_color": [135, 107, 0]},
    "chrome": {"shader_name": "chrome", "diffuse_map": ["chrome-rgb.jpg"], "diffuse_color":
[61, 61, 61], "environment_map": "environment-rgb.jpg"},
    "phone_glass": {"shader_name": "phone_glass"," diffuse_map": ["front_ glass-rgb.jpg"],
"environment_map": "environment-light.png"},
    "plastic": {"shader_name": "plastic", "diffuse_map": ["plastic-rgb.jpg"], "diffuse_color": [53,
53, 53]},
    "screen": {"shader_name": " screen", "diffuse_map": ["screen-portrait-rgb.jpg", "screen-
landscape-rgb.jpg"] ,"environment_map": "environment-light.png"},
    "speaker": {"shader name": "speaker", "diffuse_map": ["speaker-rgb.jpg"], "diffuse_color":
[28, 28, 28], "environment_map": "environment-rgb.jpg"}
  },
  // Default global lighting in the scene.
  "lights": { }
}
```

Figure 4:
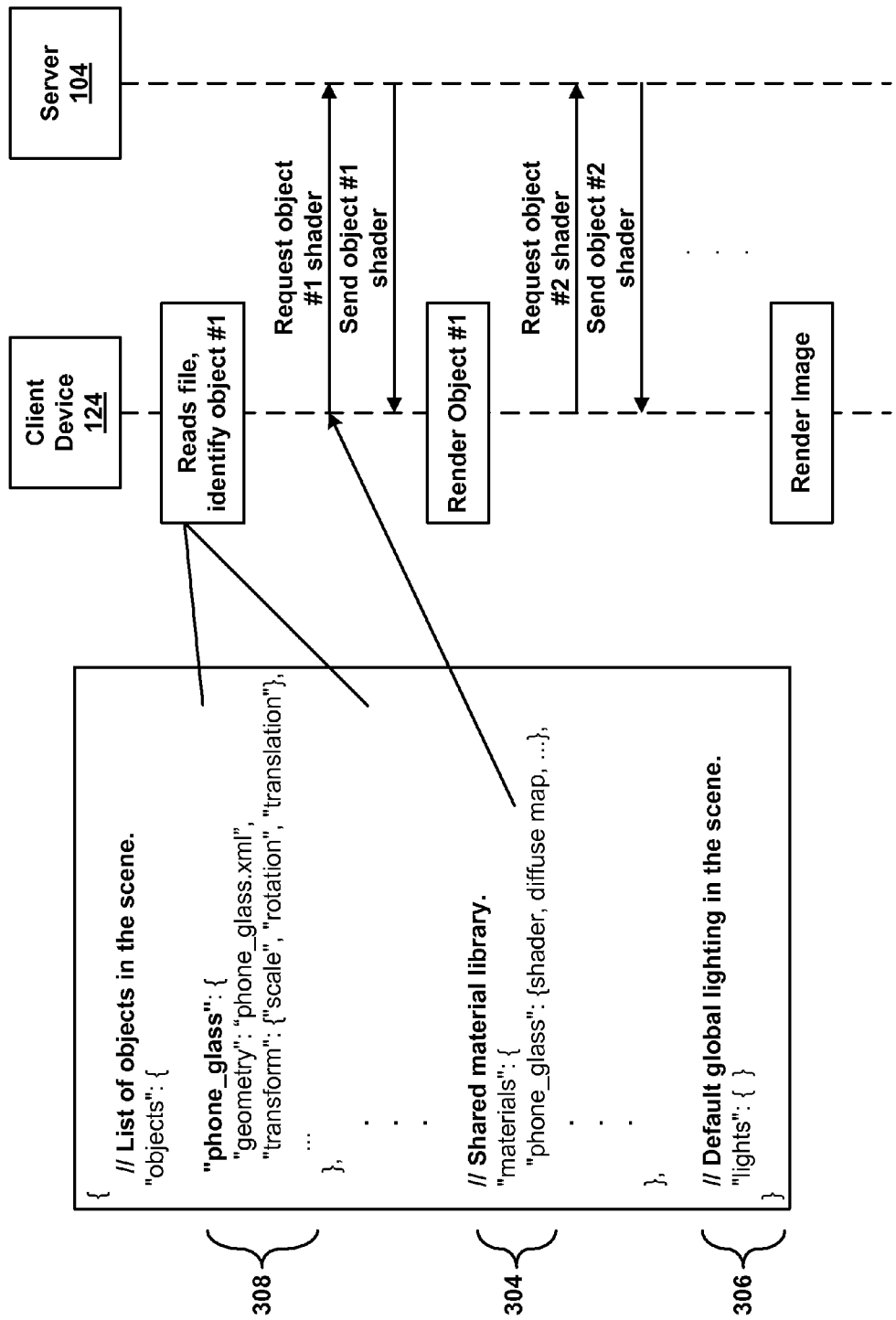
FIG. 4 illustrates a flowchart indicating an example for rendering an image.

FIG. 4 illustrates a flowchart indicating an example for rendering an image. As shown, the client device 124 may initially receive and read a 3D scene document (e.g., a file having the structure 300 of FIG. 3), and based on the object 308 and the identified material libraries, request a shader from the server 104. The client device 124 may continue to read the list of objects and continue to request shaders from the server 104 as needed. The client device 124 may render portions of a 3D object of the scene document as material information is received, or may render the entire 3D scene after receiving all material information for each object of the 3D scene, for example.

Figure 5:
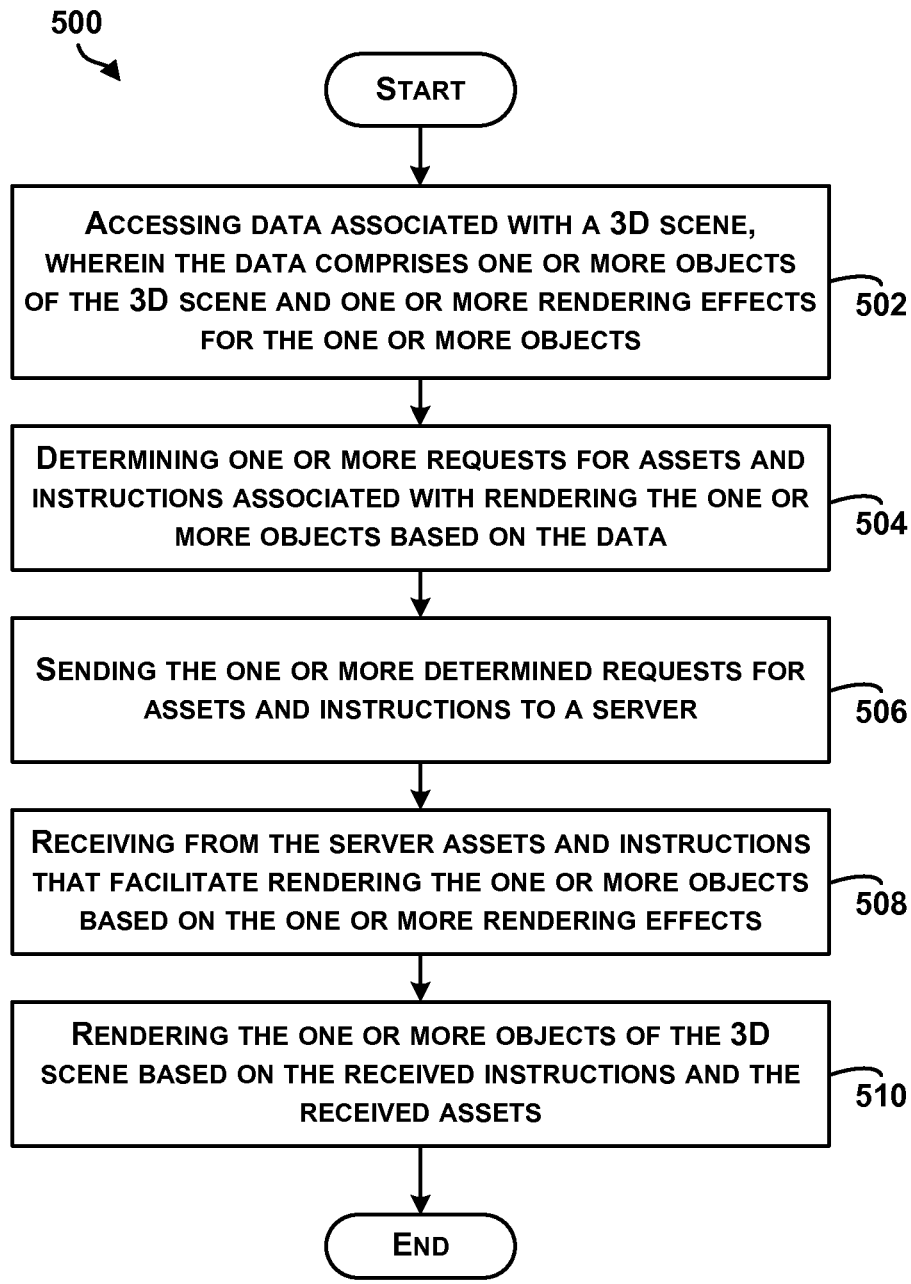
FIG. 5 is a block diagram of an example method for interpreting and translating a three-dimensional (3D) scene.

FIG. 5 is a block diagram of an example method 500 for interpreting and translating a 3D scene. Method 500 shown in FIG. 5 presents an embodiment of a method that could be used by the client device 124 of FIG. 2 or components of the client device 124, for example. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

Initially, at block 502, the method 500 includes accessing data associated with a 3D scene. The data associated with the 3D scene may include one or more objects of the 3D scene and one or more rendering effects for the one or more objects. In some examples, a 3D scene document may be provided to a computing component. The 3D scene document may be a file, for example, and may include a list of objects in a scene that are divided up according to material proprieties associated with geometric portions of objects. For example, a 3D object may be defined by a first portion having a first material property and defined by a first geometric volume and/or surface (e.g., a plastic sphere) as well as additional portions having other material and geometric properties.

In some examples, information within the 3D scene file may define a decoding scheme or technique allowing a input component (such as a file reading/processing component) to interpret the information. In one instance, the 3D scene file may include a reference to a UTF-8 decoding scheme used for character encoding. In some instances, the 3D scene file may be constructed according to a standard markup language that serves as a high level description of materials, geometry, lighting, camera angles, and composition of a scene, among other possible descriptions that may be translated into proper JavaScript requests to fetch information.

In one example, the input component may be configured to read the 3D scene file and identify a list of objects in the 3D scene. For instance, the list of objects may define various geometric portions forming a 3D object and/or information defining portions of multiple 3D objects.

The input component may also determine one or more rendering effects for the identified objects. For example, within the 3D scene file, information may define geometric properties of a first portion of a 3D object. In some examples, the geometric properties may be defined with respect to a 3D coordinate system and may specify a transformation (e.g., scaling of dimensions, rotations, translations, etc.). In other examples, the geometric properties may be defined relative to other objects defined in the 3D scene. In another example, the one rendering effects may include information identifying assets, such as shaders and maps used to render the objects or portions of the objects as well as global rendering effects for the 3D scene such as camera positions or lighting information.

At block 504, the method 500 includes determining one or more requests for assets and instructions associated with rendering the one or more objects based on the data. In some examples, the 3D scene file may include an associated specification defining protocols for defining rendering effects for one or more objects. A translation component (having a processor and a memory) may determine requests for assets and instructions based on the identified objects of the 3D scene and rendering effects defined for the objects. In one example, the requests for assets and instructions may be JavaScript based. For instance, JavaScript source code may be executed such that when objects and rendering effects within a 3D scene file are determined, JavaScript requests for information are dispatched to a server.

At block 506, the method 500 includes sending the one or more determined requests for assets and instructions to a server. As described previously, in the instance in which the determined requests are JavaScript requests, the JavaScript requests may be provided to a server.

At block 508, the method 500 includes receiving from the server assets and instructions that facilitate rendering the one or more objects based on the one or more rendering effects. In response to a received request, the server may determine/locate the requested information (e.g., rendering instructions for WebGL and a shader), and provide the information to a client device. In one example, the server may access a stored 3D object data model file and determine rendering instructions based on rendering effects for the 3D object data model as specified in a request. The server may combine identified rendering effects and information from a 3D object data model to determine code to run in WebGL, for example.

In one example, the received instructions from the server may include geometry information and the assets may include compiled shading language programs (shaders). A shader may include software instructions for performing mathematical calculations defining manipulations of individual elements (such as vertexes or polygons of a 3D mesh model) to produce visual information related to the element. The instructions may describe how to transform an element and any associated information at a 3D position in virtual space to a color for a 2D coordinate at which it appears on a screen. For instance, a particular shader may be an algorithm that combines parameters such as any combination of diffuse information, specular information, and base color information to determine a final color to be rendered based on the parameters. In a further example, the rendering effects may define a geometry shader that receives an output of a vertex shader. The geometry shader may be used to generate graphics primitives which may be ultimately provided to a pixel shader that computes color and optionally other attributes for each pixel that is rendered on the screen.

In a further example, the received instructions may be instructions that are specific to one of multiple modalities. For instance, the instructions may be selected by the server depending on factors of a client rendering the 3D scene. Example factors may include browser compatibility, input devices of an interface, screen size, display resolution, or network connection speed, among other possibilities.

As an example, a request for assets and instructions provided to the server by a client device may include a device identifier that identifies the one or more factors. In an instance in which a browser does not support HTML5 video and WebGL, the received instructions may include information associated with static images for a swivel viewer. The swivel viewer may be configured to display static images of the 3D scene rendered from separate positions around an axis of the 3D scene. In one instance, a user may click and drag to the left or right to cause the image displayed by the swivel viewer to change. In another example, a user may perform a gesture (e.g., a swipe) on a touchscreen interface to cause the image displayed by the swivel viewer to be replaced by a different image.

As another example, the received instructions may be tailored for rendering the 3D scene based on resolution and network connection speed of a client device. For instance, the rendering instructions may be customized to provide low resolution rendering effects for network connection speeds that are below an upload and/or download threshold speed. Similarly, the received assets and instructions may be tailored for touch interaction versus mouse-keyboard interaction.

At block 510, the method 500 includes rendering the one or more objects of the 3D scene based on the received instructions and the received assets. In one example, the one or more objects of the 3D scene may be rendered within a web browser based on the received instructions and the received assets. For example, geometry information and material assets (e.g., a shader) may be combined to determine a 2D image of the 3D scene. Determining the 2D image may include determining appropriate pixel values for pixels of the 2D image based on the geometry information and material assets. In some examples, compiled code may be executable using for example, WebGL or Open GL ES. Thus, in some examples, a 3D scene file and associated specifications defining the 3D scene file may enable automatically compiling the 3D scene file and any referenced instructions for rendering into code to be run in WebGL that may create a 3D scene in a web browser.

In one instance, the 3D scene file may be a small file that may be loaded by script such as JavaScript. Based on information in the 3D scene file, requests to load materials, objects, shaders, etc., necessary to render a 3D scene may be initiated, and the 3D scene may be generated.

In some instances, the 3D scene file may be beneficial for composing 3D scenes involving 3D objects that share physical materials. For example, the 3D scene file may define two separate portions that include the same glass surface. Information within the 3D scene file may reference the same shader for rendering the glass surface and define information for positioning the two separate portions relative to one another in the 3D scene.

In one example, the 3D scene file may be a standard way to describe materials. Using a 3D scene file and information referenced in the 3D scene file, a unified experience across multiple computers may be provided in terms of the appearance and visualization of an object. For example, a first 3D scene may be defined by a 3D scene file and used to render the first 3D scene on a first computer including a given object. Additionally, a second 3D scene may be rendered on a second computer including the given object using the same information used to describe the given object as in the 3D scene file. In some instances, the given object may appear visually similar in each of the 3D scenes.

In other examples, a scene may be built by designing a 3D scene file. A structure of the 3D scene file may be determined based on a standard defining ways to use HTML to define portions of objects in the 3D scene and define rendering effects associated with the portions of the objects. The 3D scene file may be read based on specifications associated with the standard and be compiled into WebGL for rendering the 3D scene.

In a further example, 3D scene writers may be able to add additional functionality to a 3D scene by modifying a 3D scene file or adding additional features to a 3D scene file. As an example, a user may define a widget such as a 3D button or interactive region within a 3D scene file. For instance, the user may define a 3D position, size, shape, and/or appearance of the widget or interactive region by specifying parameters for the widget. An example description may be "widgets: {"widget1": {widget_type": "button", "on_click": "camera_position"=[x, y, z], "camera_orientation"=[angle1, angle2, angle3]}}". The example description may enable a user to include a button, that when selected, causes the camera position of the 3D scene to change. Various other features are contemplated such as widgets for changing colors of an object (e.g., by specifying a new shader or base color for an object), causing an object to rotate (e.g., by specifying a new transformation for an object), causing an object to be displayed having an exploded view (e.g., by specifying new positions for multiple object portions), among other possibilities.

In some examples, data associated with a 3D scene may be defined according to an application-independent standard. For instance, a framework and protocols may be established such that any 3D model and associated description may be converted into a 3D scene file that includes portions of objects that are divided and grouped according to material properties. The converted 3D scene file may be translated into rendering instructions according to the steps of the method 500. Similarly, multiple 3D models (optionally described using various modeling languages) may be combined into a single 3D scene file. In one example, processes for converting 3D models described according to various 3D modeling languages into the application-independent standard may be determined. Thus, the application-independent standard may be a glue format that facilitates combining multiple 3D models into a single 3D scene file.

Figure 6:
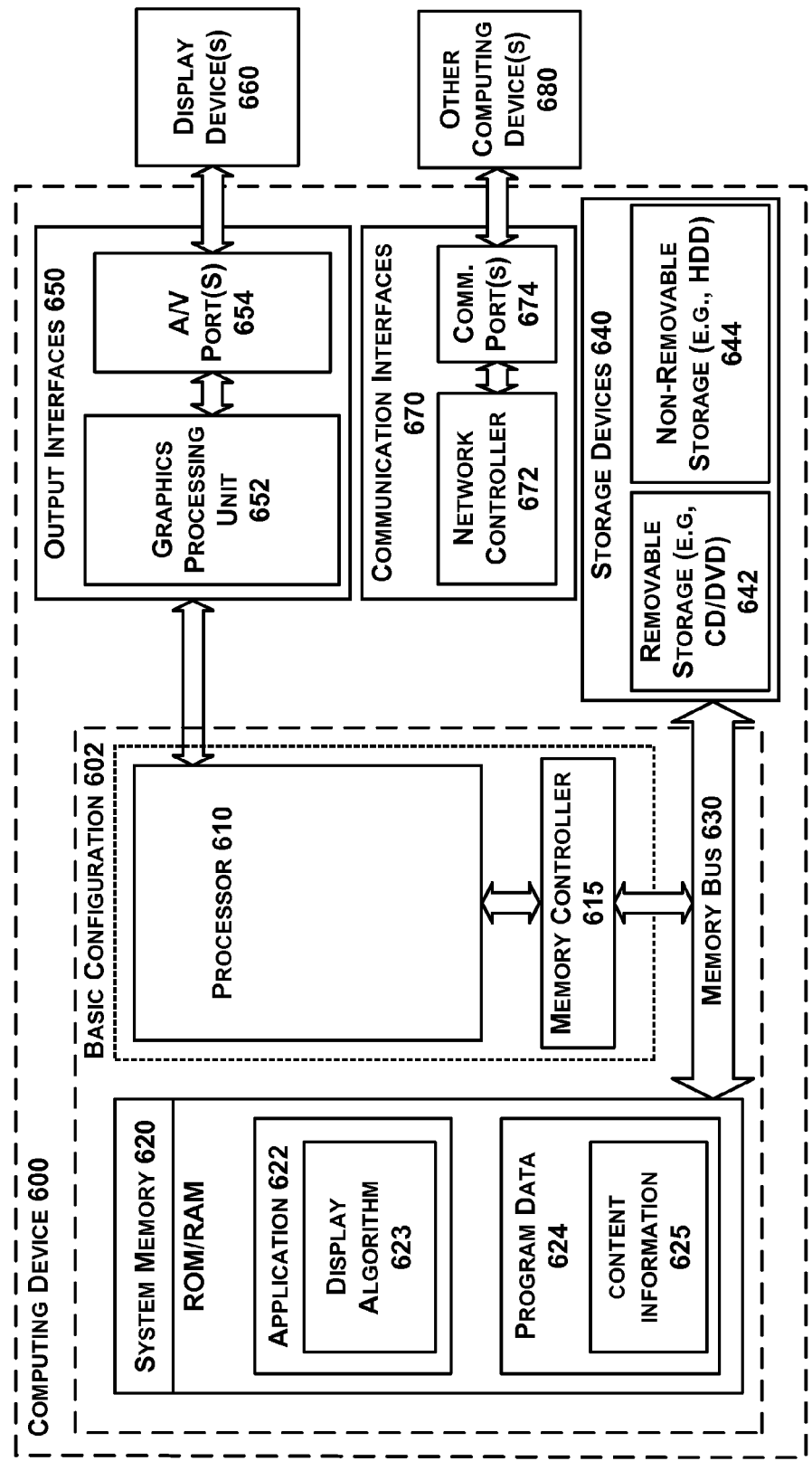
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device 600 may be a personal computer, mobile device, cellular phone, touch-sensitive wristwatch, tablet computer, video game system, or global positioning system, and may be implemented to provide a system for writing, interpreting, and/or translating three-dimensional (3D) scenes as described in FIGS. 1-5. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (μP), a microcontroller (μC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include a display algorithm 623 that is arranged to provide inputs to the electronic circuits, in accordance with the present disclosure. Program data 624 may include content information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of computing device 600.

Computing device 600 can also include output interfaces 650 that may include a graphics processing unit 652, which can be configured to communicate to various external devices such as display devices 660 or speakers via one or more A/V ports or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Figure 7:
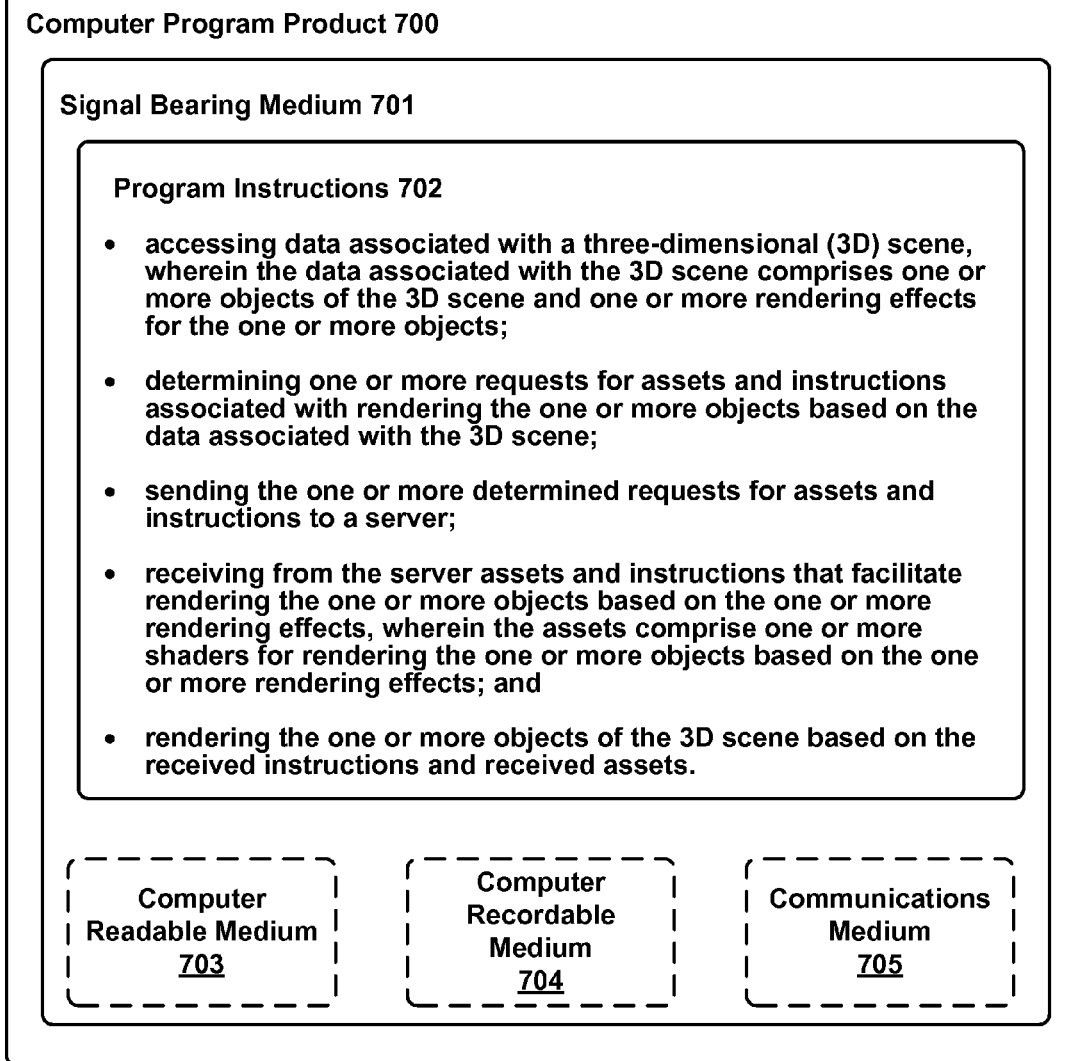
FIG. 7 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein.

In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming with the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
receiving, by one or more computing devices, a three-dimensional (3D) scene document, wherein the 3D scene document comprises a list of multiple components that, when combined according to data in the 3D scene document defining relative positioning of the multiple components, form a 3D object data model, and wherein the 3D object data model is divided into the multiple components based at least in part on respective materials of the multiple components;
identifying, by the one or more computing devices, within the 3D scene document, for components of the multiple components: (i) a respective geometry file defining a 3D structure of the component, (ii) a respective geometric transform to apply to the component, and (iii) a respective particular shader used to render the component, wherein the particular shader corresponds to the material of the component;
determining, by the one or more computing devices, for respective components of the multiple components of the 3D object data model, one or more requests for assets and instructions associated with rendering the respective component based on the respective (i) geometry file defining a 3D structure of the component, (ii) geometric transform to apply to the component, and (iii) particular shader used to render the component identified within the 3D scene document;
sending, by the one or more computing devices, the one or more determined requests for assets and instructions for the respective components to a server;
receiving, by the one or more computing devices, from the server assets and instructions that facilitate rendering the multiple components of the 3D object data model based on the data identified within the 3D scene document; and
rendering, by the one or more computing devices, the multiple components of the 3D object data model based on the geometric transforms for respective components and the received assets and instructions to thereby assemble the 3D object data model.

2. The method of claim 1, further comprising rendering the multiple components of the 3D object data model within a web browser based on the geometric transforms for respective components and the received assets and instructions.

3. The method of claim 2, wherein the instructions are provided according to specifications of an application programming interface.

4. The method of claim 1, wherein the 3D scene document further comprises lighting information and camera information for a 3D scene, the method further comprising rendering the multiple components of the 3D object data model based on the lighting information and camera information.

5. The method of claim 1, wherein the 3D scene document further comprises a description of a widget, the method further comprising rendering the widget.

6. The method of claim 5, further comprising adjusting the rendered multiple components of the 3D object data model in response to a selection of the widget.

7. The method of claim 1, wherein the received assets comprise one or more assets selected from the group consisting of: a geometry file, a shader, and a diffuse map.

8. The method of claim 1, wherein the geometric transform comprises one or more of: a scale, a rotation, and a translation.

9. A non-transitory computer-readable medium having stored therein instructions, that when executed by one or more computing devices, cause the one or more computing devices to perform functions comprising:
receiving a three-dimensional (3D) scene document, wherein the 3D scene document comprises a list of multiple components that, when combined according to data in the 3D scene document defining relative positioning of the multiple components, form a 3D object data model, and wherein the 3D object data model is divided into the multiple components based at least in part on respective materials of the multiple components;
identifying, within the 3D scene document, for components of the multiple components: (i) a respective geometry file defining a 3D structure of the component, (ii) a respective geometric transform to apply to the component, and (iii) a respective particular shader used to render the component, wherein the particular shader corresponds to the material of the component;
determining, for respective components of the multiple components of the 3D object data model, one or more requests for assets and instructions associated with rendering the respective component based on the respective (i) geometry file defining a 3D structure of the component, (ii) geometric transform to apply to the component, and (iii) particular shader used to render the component identified within the 3D scene document;
sending the one or more determined requests for assets and instructions for the respective components to a server;
receiving from the server assets and instructions that facilitate rendering the multiple components of the 3D object data model based on the data identified within the 3D scene document; and
rendering the multiple components of the 3D object data model based on the geometric transforms for respective components and the received assets and instructions to thereby assemble the 3D object data model.

10. The non-transitory computer-readable medium of claim 9, wherein the functions further comprise rendering the multiple components of the 3D object data model within a web browser based on the received instructions and the received assets.

11. The non-transitory computer-readable medium of claim 9, wherein the 3D scene document further comprises lighting information and camera information for a 3D scene, wherein the functions further comprise rendering the multiple components of the 3D object data model based on the lighting information and camera information.

12. The non-transitory computer-readable medium of claim 9, wherein the 3D scene document further comprises a description of a widget, and wherein the functions further comprise rendering the widget.

13. The non-transitory computer-readable medium of claim 12, wherein the functions further comprise adjusting the rendered multiple components of the 3D object data model in response to a selection of the widget.

14. A system, comprising:
an input component, the input component configured to receive a three-dimensional (3D) scene document to determine (i) geometry information associated with multiple components of a 3D object data model in a 3D scene and (ii) one or more rendering effects for the multiple components of the 3D object data model based on data within the 3D scene document, wherein the geometry information defines a relative positioning of the multiple components of the 3D object data model with respect to one another, and wherein the multiple components of the 3D object data model form a single 3D object, and wherein the 3D object data model is divided into the multiple components based at least in part on respective materials of the multiple components;

an identification component, the identification component configured to identify for one or more of multiple components of a 3D object data model: (i) a respective geometry file defining a 3D structure of the component, (ii) a respective geometric transform to apply to the component, and (iii) a respective particular shader used to render the component, wherein the particular shader corresponds to the material of the component; and wherein the multiple components form the 3D object data model when combined according to data in the 3D scene document defining relative positioning of the multiple components;

a translation component, the translation component configured to: determine one or more requests for assets and instructions associated with rendering respective components of the multiple components of the 3D object data model based on the respective (i) geometry file defining a 3D structure of the component, (ii) geometric transform to apply to the component, and (iii) particular shader used to render the component data identified within the 3D scene document; and configured to send the one or more determined requests for assets and instructions for the respective components to a server; and a rendering component, the rendering component configured to render the multiple components of the 3D object data model based on assets and instructions received from the server and the geometric transforms for respective components, and thereby assemble the 3D object data model.

15. The system of claim 14, wherein the rendering component is further configured to render the multiple components of the 3D object data model within a web browser based on the instructions.

16. The system of claim 14, wherein the data within the 3D scene document further comprises lighting information and camera information for a 3D scene, and wherein the rendering component is further configured to render the multiple components of the 3D object data model based on the lighting information and camera information.

17. The system of claim 14, wherein the data within the 3D scene document further comprises a description of a widget, and wherein the rendering component is further configured to render the widget.

18. The system of claim 17, wherein the rendering component is further configured to adjust the rendered multiple components of the 3D object data model in response to a selection of the widget.

19. The system of claim 14, wherein the rendering component is further configured to render at least two of the multiple components of the 3D object data model using a given shader.

* * * * *